US 8,654,181 B2

(12) United States Patent
Cornog et al.

(10) Patent No.: US 8,654,181 B2
(45) Date of Patent: Feb. 18, 2014

(54) METHODS FOR DETECTING, VISUALIZING, AND CORRECTING THE PERCEIVED DEPTH OF A MULTICAMERA IMAGE SEQUENCE

(75) Inventors: Katherine H. Cornog, Medford, MA (US); Shailendra Mathur, Beaconsfield (CA); Stephen McNeill, St. Lazare (CA)

(73) Assignee: Avid Technology, Inc., Burlington, MA (US)

( * ) Notice: Subject to any disclaimer, the term of this patent is extended or adjusted under 35 U.S.C. 154(b) by 421 days.

(21) Appl. No.: 13/073,449

(22) Filed: Mar. 28, 2011

(65) Prior Publication Data

US 2012/0249746 A1 Oct. 4, 2012

(51) Int. Cl.
*H04N 13/02* (2006.01)

(52) U.S. Cl.
USPC ............................................................ 348/47

(58) Field of Classification Search
USPC .................................................... 348/42–47
See application file for complete search history.

(56) References Cited

U.S. PATENT DOCUMENTS

| | | | | |
|---|---|---|---|---|
| 5,977,978 | A * | 11/1999 | Carey et al. ..................... | 345/419 |
| 7,679,616 | B2 * | 3/2010 | Nomura et al. ................. | 345/419 |
| 8,085,293 | B2 * | 12/2011 | Brodsky et al. ................. | 348/49 |
| 8,149,268 | B1 * | 4/2012 | Meyers et al. .................. | 348/42 |
| 8,359,537 | B2 * | 1/2013 | Lyons et al. .................... | 715/723 |
| 8,433,157 | B2 * | 4/2013 | Nijim et al. ..................... | 382/285 |
| 8,467,628 | B2 * | 6/2013 | Coffman ....................... | 382/285 |
| 2004/0057612 | A1 | 3/2004 | Tabata | |
| 2005/0244050 | A1 * | 11/2005 | Nomura et al. ................. | 382/154 |
| 2007/0139612 | A1 | 6/2007 | Butler-Smith | |
| 2010/0017885 | A1 * | 1/2010 | Cohen et al. ..................... | 726/26 |
| 2010/0033554 | A1 * | 2/2010 | Kobayashi ....................... | 348/43 |
| 2010/0142801 | A1 * | 6/2010 | Koppal et al. ................... | 382/154 |
| 2010/0154065 | A1 * | 6/2010 | Cohen et al. ..................... | 726/28 |
| 2010/0309287 | A1 * | 12/2010 | Rodriguez ....................... | 348/43 |
| 2011/0096147 | A1 * | 4/2011 | Yamazaki et al. ............... | 348/43 |
| 2011/0109720 | A1 * | 5/2011 | Smolic et al. ................... | 348/43 |
| 2011/0142309 | A1 * | 6/2011 | Zhang et al. .................... | 382/128 |
| 2011/0148875 | A1 * | 6/2011 | Kim et al. ....................... | 345/420 |
| 2011/0211042 | A1 * | 9/2011 | Thorpe et al. ................... | 348/43 |
| 2011/0307526 | A1 * | 12/2011 | Roenning ....................... | 707/803 |
| 2012/0008672 | A1 * | 1/2012 | Gaddy et al. ................ | 375/240.01 |
| 2012/0030182 | A1 * | 2/2012 | Claman et al. .................. | 707/690 |
| 2012/0050485 | A1 * | 3/2012 | Thorpe et al. ................... | 348/46 |

OTHER PUBLICATIONS

The Foundry, Ocula—plug-Ins for Stereoscopic post production, May 11, 2009; http://www.youtube.com/watch?v=8tczmBIXmes.
Mendiburu, Bernard, "3D Movie Making Making—Stereoscopic Digital Cinema from Script to Screen" Elsevier Inc., 2009, Chapters 9 & 10, pp. 151-196.
Gardner, Brian, "Perception & The Art of 3D Storytelling", Creative COW, Stereoscopic 3D Issue, 2009, pp. 1-12.

* cited by examiner

*Primary Examiner* — Joseph Ustaris
*Assistant Examiner* — Talha Nawaz
(74) *Attorney, Agent, or Firm* — Oliver Strimpel

(57) ABSTRACT

A set of tools in a media composition system for stereoscopic video provides visualizations of the perceived depth field in video clips, including depth maps, depth histograms, time-based depth histogram ribbons and curves displayed in association with a media timeline, and multi-panel displays including views of clips temporally adjacent to a clip being edited. Temporal changes in perceived depth that may cause viewer discomfort are automatically detected, and when they exceed a predetermined threshold, the editor is alerted. Depth grading tools facilitate matching depths in an outgoing clip to those in an incoming clip. Depth grading can be performed automatically upon detection of excessively large or rapid perceived depth changes.

18 Claims, 11 Drawing Sheets

METHODS FOR DETECTING, VISUALIZING, AND CORRECTING THE PERCEIVED DEPTH OF A MULTICAMERA IMAGE SEQUENCE

BACKGROUND

The perception of depth in a stereoscopic 3D movie is created by viewing left and right images in which objects at different depths are displayed with different horizontal offsets. This offset is called image disparity or pixel parallax. The perceived depth of an object is determined by its parallax angle, which is the angular difference of a 3D point's projection onto the left and right retinas. The parallax angle of an object viewed in a stereoscopic image sequence is determined by the image disparity, display screen size, the location of the viewer, and the characteristics of the viewer's visual system, in particular the viewer's inter-ocular distance. The principles governing the relationship between the depth perceived by a viewer, image disparity, and the other relevant parameters are well known in the art, and are described, for example, in "3D Movie Making" by Bernard Mendiburu, published by Focal Press of Burlington, Mass., which is wholly incorporated herein by reference.

During the content authoring process, image disparities may be computed by an algorithm which operates on left-right stereo image pairs. Disparity is represented as a signed quantity, which by convention is zero for objects on the convergence surface, positive for objects beyond it, and negative for objects in front of it. Disparity values in raw footage are determined by the 3D location of an object, the configuration of the cameras, and the camera parameters, including convergence angle, focal length, inter-axial distance, sensor size, and image resolution.

A key aspect of disparity computations is finding the same point in the left image and in the right image, known as solving the correspondence problem. Basic algorithms use correlation to locate similar looking patches in an image pair. In the general case, corresponding image points in the left and right images have both a horizontal and a vertical offset. Determination of the disparities for an image yields a disparity map that is a 2D vector field. In fact, two sets of disparity maps can be computed: one for left-to-right comparisons, and one for right-to-left comparisons, which together yield a map having four values per pixel.

Many stereo algorithms reduce the disparity map to one value per pixel. In one approach, this is achieved by first rectifying the two images such that their scan lines align with epipoloar lines, then by searching in along each scan line to calculate a one dimensional disparity value for each pixel. In another approach, when the two images are close to rectified, the vertical component of the disparity can be computed and ignored, since in that case the horizontal component alone may be a good measure of disparity.

To solve the problem of multiple matches, various constraints are employed. One constraint preserves point ordering, since it can be expected that when moving along a scan line object points in left and right images will be ordered in the same manner, unless they are occluded, in which case they are missing. A smoothness constraint may be employed, which relies on the fact that in most parts of an image, disparity does not change suddenly unless moving across a depth edge.

Directors are increasingly shooting with more than two cameras. The additional cameras can provide views of regions that are occluded in other camera views, and the extra information they provide makes the depth calculations more robust. In the general case, data from all the cameras are used to determine correspondence between 3D points in the world and their projection into each image. This information can be used to derive disparity between any two of the cameras, which can then be used during the editing process to correct, modify or regenerate a left-right image pair for stereoscopic viewing.

SUMMARY

When working with stereoscopic 3D media, editors need to be able to view, manipulate, and correct problems with perceived depth. Methods for detecting the perceived depth of moving stereoscopic images and for visualizing, analyzing, manipulating and correcting undesirable depth changes are described.

In general, in one aspect, a method involving perceived depth in stereo image pairs includes: receiving a sequence of stereo image pairs, each stereo image pair including a left eye image and a right eye image; for each stereo image pair of the sequence determining a disparity value between a plurality of locations within the left eye image and a corresponding plurality of locations in the right eye image of that stereo image pair and computing a value of a perceived depth metric from the disparity values; and issuing a notification when a measure of change of the perceived depth metric values among the stereo image pairs of the sequence exceeds a predetermined threshold.

Various embodiments include one or more of the following features. The sequence of stereo image pairs is received by a media composition software application, and the disparity values are determined by a plug-in software module in data communication with the media composition software application. For each stereo image pair of the sequence, using the disparity values to compute corresponding perceived depth values, wherein computing the value of the perceived depth metric is based on the perceived depth values. The perceived depth metric is based on an average of the perceived depth values of the plurality of locations. For each stereo image pair of the sequence, the perceived depth metric is based on a perceived depth value of a feature in a distribution of the perceived depths of the plurality of locations, wherein the feature characterizes one or more scene elements in the sequence. The feature is a peak in the distribution of perceived depths of the plurality of locations. For a selected stereo image pair of the sequence, using a media composition software application to output a histogram of the perceived depth distribution on a display, and enabling a user of the software application to define the feature on the display. The plurality of locations corresponds to a plurality of pixel locations in one of the left eye image and the right eye image. The sequence of stereo image pairs is received by a media composition software application, a user interface of the media composition software application including a displayed timeline corresponding to the sequence of stereo image pairs, and the issued notification is displayed as a graphical indicator on the timeline at a timeline location indicative of a sequential location in the sequence at which the measure of change of the perceived depth metric exceeds the threshold. The disparities are determined by building a reconstruction of three dimensional scene points by using sequences of scene images captured simultaneously by a set of three or more cameras, each camera capturing the scene from a different viewpoint, wherein each of the left eye images of the sequence of stereo image pairs were captured by a first one of the set of cameras and wherein each of the right eye images of the sequence of stereo image pairs were captured by a second one of the set of cameras. The measure of change is a rate of change of the perceived depth metric among two or more sequentially adjacent stereo image pairs of the sequence. The sequence includes a plurality of clips, and the measure of change is based on a difference between the perceived depth metrics of one or more stereo image pairs of a first clip and one or more stereo image pairs of a second clip. The sequence is received by a media composition software application, and a user of the software application selects a first and a second stereo image pair from the sequence and the measure of change is based on a difference between the perceived depth metrics of the first and second stereo image pairs.

In general, in another aspect, a method involving perceived depth in stereo image pairs includes: receiving a sequence of stereo image pairs, each stereo image pair including a left eye image and a right eye image; for each stereo image pair of the sequence, receiving perceived depth information for each of a plurality of locations within that stereo image pair and computing a value of a perceived depth metric based on the depth information; and issuing a notification when a measure of change of the perceived depth metric values among the stereo image pairs of the sequence exceeds a predetermined threshold. In various embodiments, the perceived depth information includes disparity values.

In general, in a further aspect, a method for visualizing perceived depth values within a sequence of stereo image pairs includes: receiving the sequence of stereo image pairs, wherein each stereo image pair comprises a left camera image and a right camera image; and for each stereo image pair of the sequence: determining a disparity value between a plurality of locations within the left eye image and a corresponding plurality of locations in the right eye image of that stereo image pair; and based on the disparity values, displaying a representation of a distribution of perceived depth values of the stereo image pair, wherein the representation is displayed on a timeline of a media composition software application at a timeline location corresponding to a sequence position of the stereo image pair within the sequence of stereo image pairs.

Various embodiments include one or more of the following features. The representation comprises a column of pixels perpendicular to a temporal axis of the timeline, a position along the column of pixels representing a corresponding perceived depth value, a pixel in the column at the position having a visual attribute indicating a magnitude of a population of pixels in the stereo image pair having the perceived depth value represented by the position along the column. The columns are displayed adjacent to each other to form a histogram ribbon in temporal correspondence with the timeline. Enabling a user of the software application to select a contiguous region of the histogram ribbon, determining a range of perceived depth values defined by a range of the selected region perpendicular to the timeline, and enabling the user to insert graphical elements into a temporal subset of the sequence of stereo image pairs defined by a horizontal extent of the contiguous region of the histogram ribbon, wherein the graphical elements are placed within the determined range of perceived depth values. The determined range of perceived depths corresponds to a substantially unoccupied portion of the perceived depth range of stereo image pairs within the defined temporal subset of the sequence. The determined range of perceived depth values corresponds to depth values nearer to a viewer of the sequence of stereo image pairs than an average of the perceived depth distribution of the defined temporal subset of the sequence.

In general, in yet another aspect, a method of adjusting perceived depth values of a sequence of stereo image pairs includes: selecting source and target stereo image pairs from the sequence of stereo image pairs; defining one or more source perceived depth values of the source stereo image pair; for each of the one or more source perceived depth values, identifying a corresponding destination perceived depth value in the target stereo image pair; defining a reference perceived depth mapping that maps each of the one or more source perceived depth values to its corresponding destination perceived depth value; and transforming perceived depth values of substantially all locations within the source stereo image pair in accordance with the reference mapping; and rendering the source stereo image pair based on the transformed perceived depth values.

Various embodiments include one or more of the following features. Each of the steps is performed automatically by a computer-based media editing software application. The transforming step involves transforming at least one of a left image and a right image of the source stereo image pair to alter disparity values between the left image and the right image. The selecting step is performed by a user of a media editing software application. A media editing software application outputs to a display one of the left image and the right image of the source stereo image pair and one of the left image and right image of the target stereo image pair, and enabling a user of the software application to use a graphical input device in communication with the software application to select one or more source locations in the displayed image of the source stereo image pair, each of the one or more source perceived depth values being defined by a perceived depth value of its source location and to use the graphical input device to select in the displayed image of the destination stereo image pair corresponding destination locations for each of the one or more source locations, each of the one or more destination perceived depth values being defined by a perceived depth value of its destination location. The software application enables the user to use the graphical input device to select the source and destination locations using one of eye dropper tool, a lasso tool, and a paint tool. Enabling the user to select a third stereo image pair of the sequence, wherein the media editing software application outputs to the display one of the left image and the right image of the third stereo image pair, and wherein the third stereo image pair is selected to provide a contextual reference for the user. Displaying a perceived depth map derived from source stereo image pair and enabling the user to define source perceived depth values by using a graphical input device to select a source location corresponding to each of the one or more source perceived depth values on the displayed depth map. Displaying a depth map histogram of the source stereo image pair and enabling the user to define the source perceived depth values by selecting a depth value corresponding to each of the source perceived depth values in the displayed depth map histogram. The reference perceived depth mapping is a linear mapping or a non-linear mapping. The source stereo image pair is selected from a first clip within the sequence of stereo image pairs and the target stereo image pair is selected from a second clip within the sequence of stereo image pairs. Each of a sequential plurality of stereo image pairs of the first clip, including the source stereo image pair, is transformed using a perceived depth mapping based on the reference perceived depth mapping and based on a sequential position of that stereo image pair in the first clip. The sequential plurality of stereo image pairs of the first clip corresponds to a transition region of the first clip adjacent to a boundary with the second clip in an edited stereoscopic video sequence comprising the first clip followed by the second clip. For each of the sequential plurality of stereo image pairs of the first clip, the perceived depth mapping causes an alteration in perceived depth that increases monotonically with the sequential position of the stereo image pair. Each of a sequential plurality of stereo image pairs of the second clip, including the target stereo image pair, is transformed using a perceived depth mapping based on an inverse of the reference perceived depth mapping and based on a sequential position of that stereo image pair in the second clip.

DETAILED DESCRIPTION

When viewing stereoscopic 3D media, sudden changes in the perceived depth of objects of interest, or changes in the position or spread of the range of displayed perceived depths, referred to as the depth bracket, may cause viewer discomfort. In addition, discomfort can arise from a depth bracket that is too large. The discomfort stems from the convergence changes required by the viewer in order to perceive the displayed depths. It is therefore desirable during the post-production process to enable editors to avoid creating uncomfortable viewing experiences by limiting perceived depth changes to a range that can be viewed comfortably. A set of tools are described that facilitate the detection, visualization, analysis, and correction of perceived depth problems.

In the described embodiment, the tools are provided as features of a media composition system, which may be a non-linear media editing application that runs on a client, such as a computer running Microsoft Windows R® or the Mac OS®. Examples of non-linear media editing applications include Media Composer® from Avid Technology, Inc. of Burlington, Mass., described in part in U.S. Pat. Nos. 5,267,351 and 5,355,450, which are incorporated by reference herein, and Final Cut Pro® from Apple Computer, Inc. of Cupertino Calif. The media composition system is connected to local media storage by a high bandwidth network implemented using such protocols as Fiber Channel, Infini-Band, or 10 Gb Ethernet, and supporting bandwidths on the order of gigabits per second or higher. The media storage may include a single device or a plurality of devices connected in parallel. The media composition system receives the stereoscopic 3D media, either by retrieving the media from local media storage, or by downloading the media over a wide area network such as the Internet from a remote server.

Figure 1:
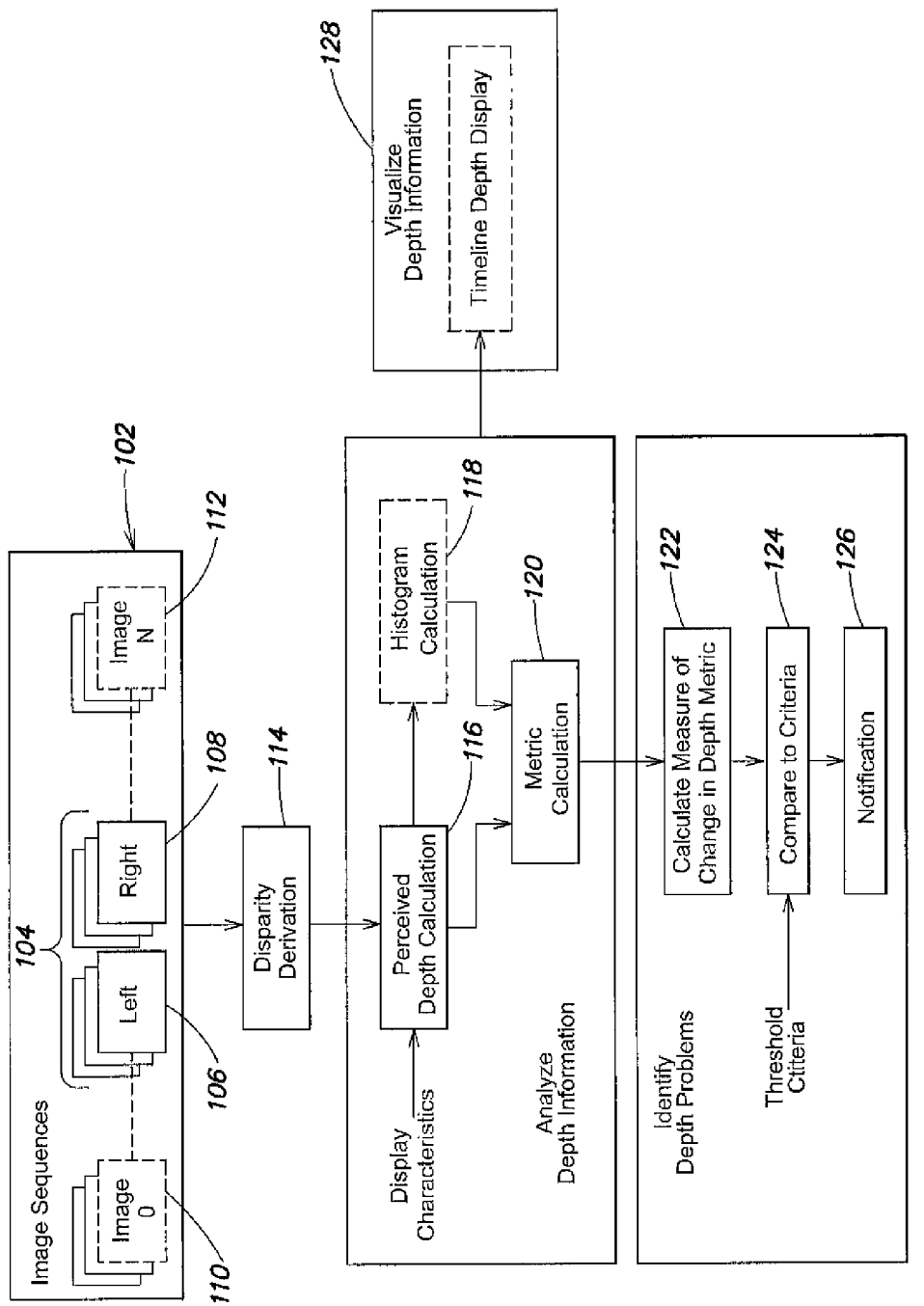
FIG. 1 shows a high level flow diagram of the main steps involved in the analysis, visualization, detection, and correction of perceived depth problems in a multi-camera sequence of images.

A high level flow diagram showing the main steps involved in the detection, visualization, analysis, and correction of perceived depth problems in a stereoscopic sequence of images is shown in FIG. 1. The process starts with image sequences 102, which are received by a system running media processing or media composition software. At a minimum, the image sequences include stereo image pairs (104), corresponding to images captured from a left camera position (106) and a right camera position (108). 3D media may be based on video captured from more than two cameras. For example, makers of movies are increasingly making use of "wing cameras" that provide video from lateral viewpoints. When more than two cameras are used in a shoot, additional views (110, 112) become available. In the general case, for n cameras, each frame time of the sequence includes n images.

In the next step, disparities are derived (114) from the image sequences by comparing images corresponding to the same frame time. The comparison involves two images (left and right) when stereoscopic image sequences are received. When additional camera views are available, the disparity derivation can use the additional imagery to improve the accuracy and robustness of the results. Although the embodiments described herein concentrate mainly on two-camera stereoscopic media, the systems and methods are extendible to media having more than two views, including three, four, and more views.

In some systems, disparity values between the left camera and right camera images are derived either by a processing unit housed within the stereo camera rig itself, or by an image processing device accompanying the rig, and transmitted to a media composition system in association with the sequences of stereo image pairs. In other systems, the media composition system receives only the stereo image pair sequences, and derives the disparity values itself (or uses a third party plug-in module associated with the media composition system).

Figure 2:
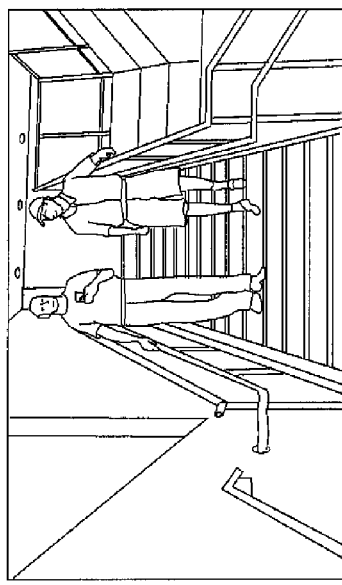
FIG. 2 shows a stereo image pair and a gray scale image representing perceived depth derived from the pair.
Figure 2:
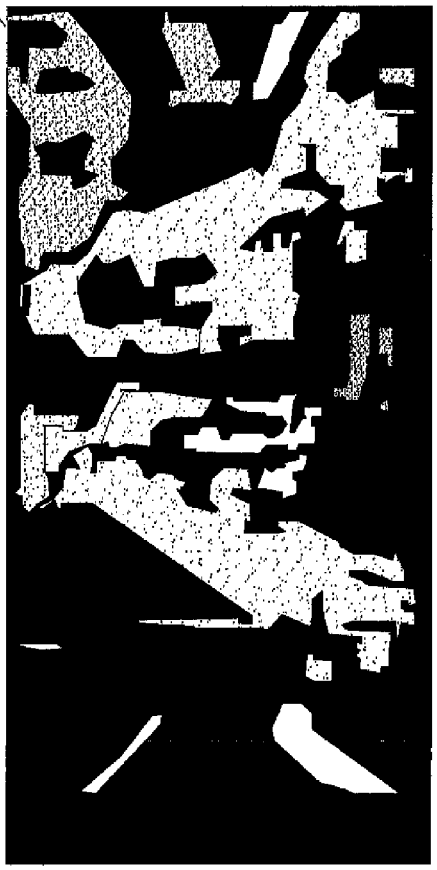
Figure 2:
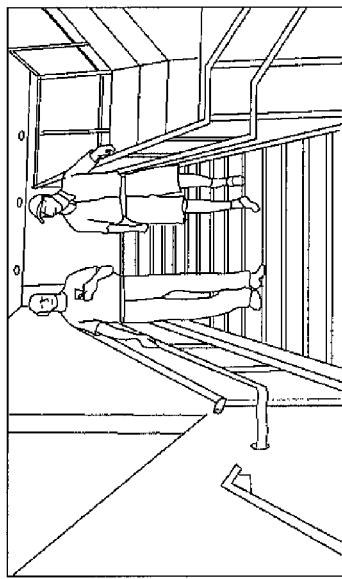

The disparity algorithm generates a two-dimensional array of floating point disparity values, which can be positive or negative, expressed in units of pixels. Disparity may also be expressed as a percentage of the screen width. Non-zero values represent the difference in the projected location of a 3D world point in the left image and the projected location of the same 3D world point in the right image or vice-versa. In the next step (116), the perceived depth of each point in the array is derived from the corresponding disparity value via an inverse relationship that incorporates the output resolution and screen size. Perceived depth is expressed in absolute distance units (e.g., feet), or as a percentage of the distance between the screen and the viewer. One way of visualizing the disparities, or the derived depths, is to display a gray scale image in which the depths are scaled and added to an offset so that they fall within an allowable pixel value range, e.g., 0-255, with the far and near depth limits corresponding to 0 and 255 respectively. An example of a pair of stereoscopic images (202, 204) and the corresponding output (206) from a disparity algorithm is illustrated in FIG. 2. Based on disparity analysis, the gray scale image (206) represents the perceived depth of the various locations in the image pair, with lighter colors representing closer objects. Although such a display can be valuable in determining whether a disparity algorithm is performing correctly, it is not easily amenable to quantitative analysis.

In described embodiment, the perceived depth of each location within a stereo image pair is derived from identified disparities between corresponding locations in the left camera image and the right camera image. In addition, or alternatively, other information may be used to obtain perceived depth information from a stereo pair, including the use of occlusion and the apparent size of objects in the images. The methods described herein are not dependent on the particular technique used to obtain perceived depth values; all that is required is that the perceived depth values across a sequence of stereo image pairs, or within subregions of the sequence's stereo image pairs be provided. However, in the description that follows, it is assumed that a disparity algorithm is used to determine perceived depth, and that the depths may be obtained from either dense or sparse disparity maps.

Figure 3:
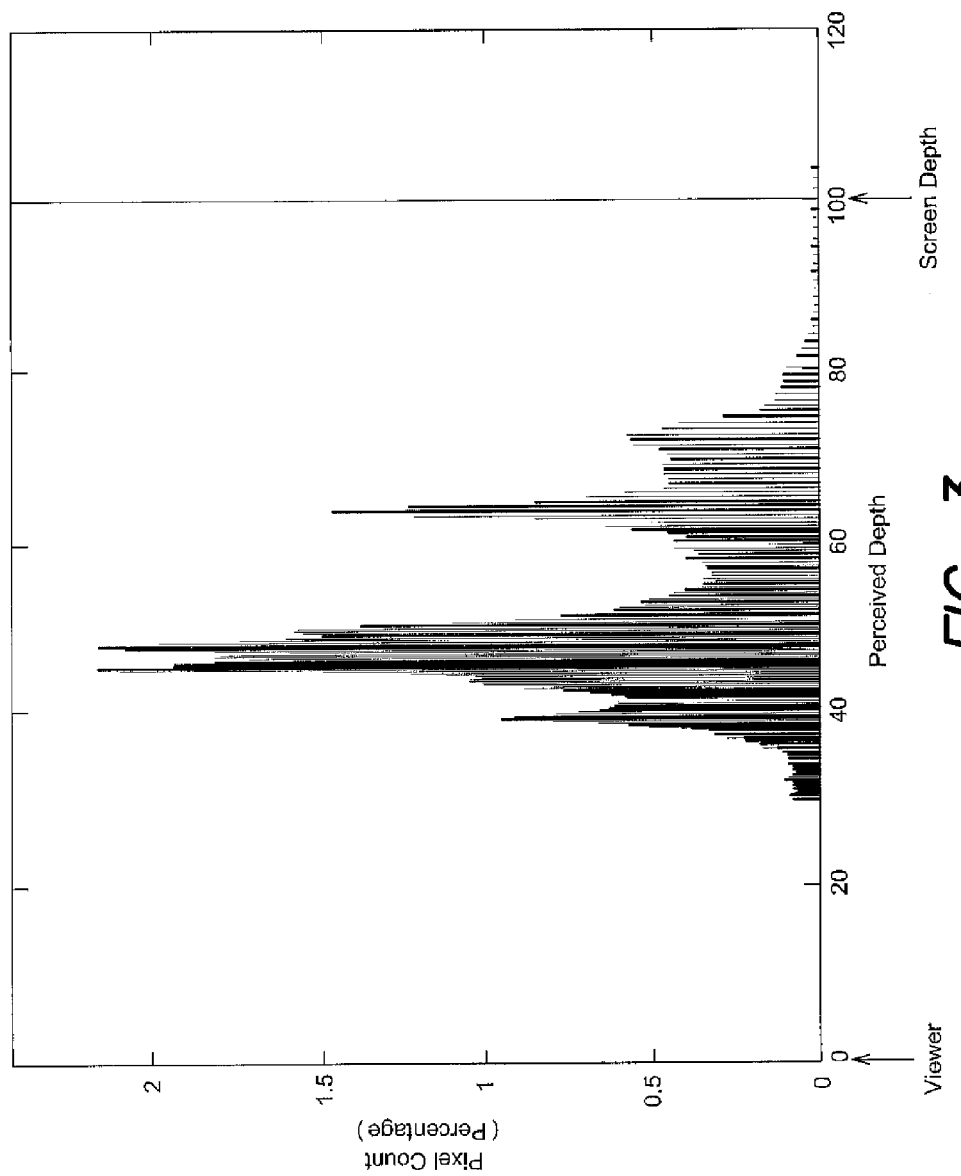
FIG. 3 is a perceived depth distribution histogram derived from the stereo image pair shown in FIG. 2.

In order to perform quantitative analysis and adjustment of perceived depth values, the array of perceived depth values are statistically analyzed. The various properties derived include the range of depths within an image, mean values, and the location of peaks in the distribution range. To help visualization of the depths in an image, it is useful to generate a depth histogram (118), which is a representation of the distribution of the pixels of a stereo image pair over perceived depth. The height of each histogram column represents the percentage of pixels in the image at the perceived depth value. A depth histogram for the single frame pair shown in FIG. 2 is plotted in FIG. 3.

When working with a sequence of stereo image pairs that constitute a stereoscopic 3D video clip, with each member of the sequence corresponding to one time sample of the clip, a set of histograms is generated. Appropriate visualization of the set of histograms enables an editor to see the changes in perceived depth over time and to identify parts of the sequence where there are rapid changes in the distribution of perceived depths, and/or in the depth bracket, or where the depth bracket is too large. As discussed above, such areas may cause viewer discomfort. The described tools and techniques provide editors and compositors with a means of identifying and correcting such problems during the post-production phase of a media creation project.

A first tool enables detection of rapid or discontinuous changes in the depth bracket of a stereoscopic image sequence. In the most common application of the methods described herein, such changes in perceived depth occur at the boundary between two clips of stereo video, i.e., at the location of a cut. Such cuts occur in almost all video compositions, since editors normally wish to build a video program by combining a sequence of separate video clips. At cut locations, the depth jumps occur between the last frame pair of the outgoing clip and the first frame pair of the incoming clip.

Figure 4:
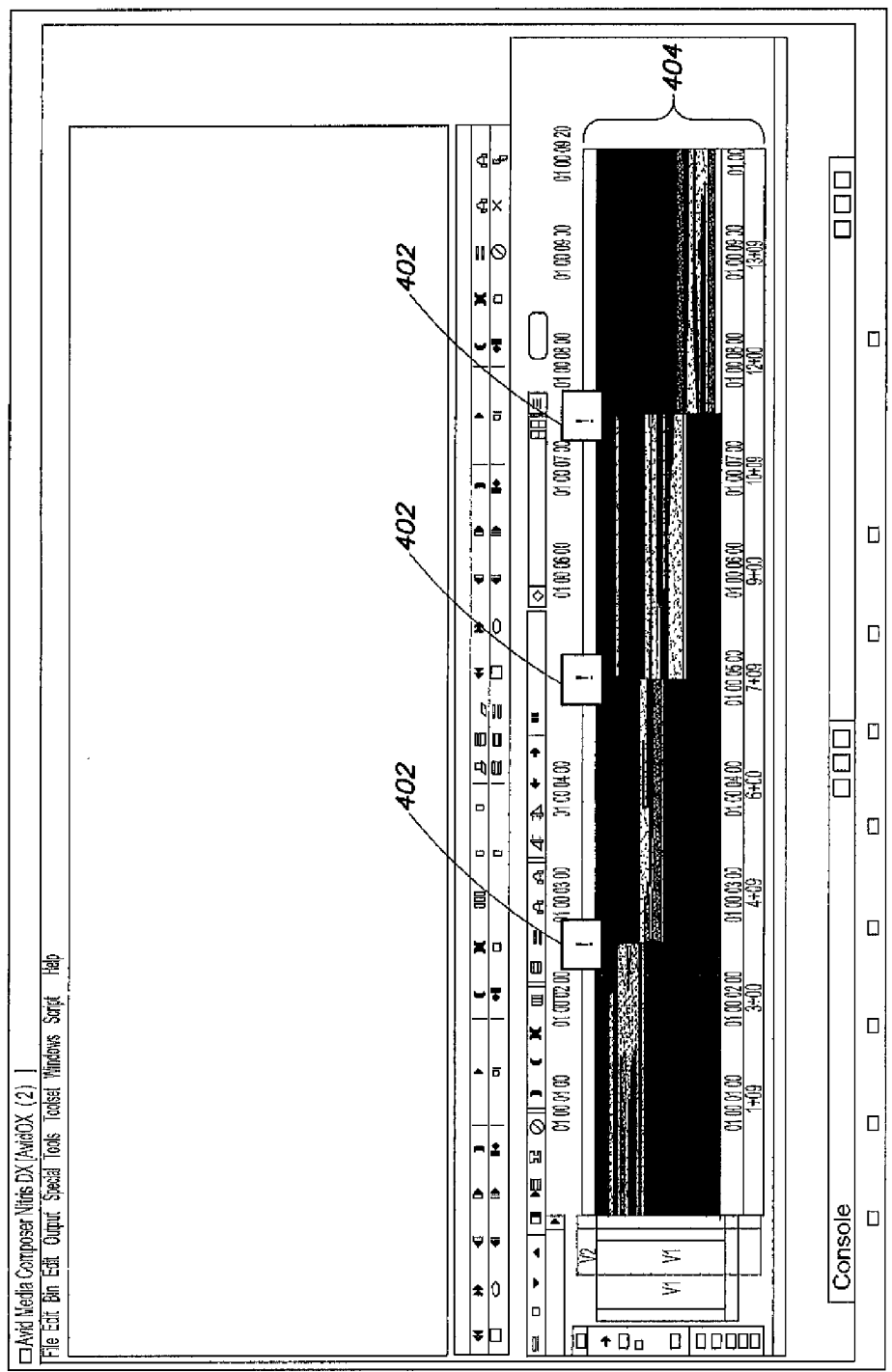
FIG. 4 illustrates placing a visual marker in a timeline of a software application for editing stereoscopic 3D media.

The depth values for each stereo image pair in an image sequence are computed by repeated application of a disparity algorithm. A histogram of the distribution of perceived depths of each frame is generated and statistically analyzed. A metric derived from each histogram is calculated for each frame (FIG. 1, 120). The system automatically determines a measure of change of the depth metric along the sequence (122), looking for places where the measure of change of the depth metric exceeds a threshold value (124). If the measure of change exceeds the threshold value, the system issues a notification (126). This may take the form of placing a visual marker in the user interface of the media composition system, making an alarm sound, or pausing during playback. The user interface of most media composition systems includes a displayed horizontal timeline that represents the temporal locations and extent of various components of the composition being edited. The visual marker may be placed in the timeline, indicating the location within the sequence of the rapid perceived depth change. The location may be specified in terms of a time code, frame code, or keycode. An example of such notification is illustrated in FIG. 4, which shows visual notification markers 402 placed on timeline 404. In other embodiments, the system notifies the user of a depth problem at a clip boundary by highlighting the last frame of the outgoing clip and/or the first frame of the incoming clip when it is visible in the playback window. An example of such a highlight is a distinctive outline around the frames, such as a red border. Other system notifications of perceived depth changes that exceed a threshold can involve writing the corresponding time codes to a text file, or returning time codes from a function call or from a remote query (such as a remote procedure call or a web service return).

In various embodiments, the derived metric is the value of the arithmetic mean, the median, or the mode of the perceived depth distribution. In some embodiments, the metric is the perceived depth value associated with a peak in the perceived depth distribution histogram, such as the peak having the smallest perceived depth, or the peak corresponding to an object of interest previously identified in the image sequence. It is desirable to choose a metric that identifies sudden changes in the shape and range of the perceived depth distribution, distinguishing large changes, but avoiding changes that are primarily due to a change of scene without a corresponding large change in the depth of objects of interest. The choice of metric may depend on the kind of material being edited. For example, in some cases the metric is weighted to objects near the center of the image since the objects of greater interest are likely to appear there. Various metrics may be evaluated in conjunction with each other. For example, if the mean perceived depth values are broadly similar across a clip boundary, the system may compare the location of the major peak in the histogram, and flag it if it differs by more than a predetermined amount.

The measure of change of the depth metric may be determined by calculating a difference between the metric of two successive frames of the sequence. Other measures of change include the detection of a local peak in the change of the depth metric. One method of implementing peak detection uses a sliding window of successive frames, and derives an average change for the group of frames within the sliding window. This helps avoid false positives in regions where there are large changes between successive frames, such as when the camera is zooming, or if large objects are moving in depth. The editor is interested in changes that exceed the locally normal frame-to-frame changes; the sliding window enables the system to flag changes that exceed the local average frame-to-frame changes.

In the described embodiment, the system issues a notification when the derived metric change exceeds a predetermined threshold. The threshold is specified by the user, determined by system preferences, or set automatically based on parameters of the stereo image sequence. In various embodiments, the threshold is a heuristic set based on empirical results from different kinds of footage. Alternatively, a machine learning technique may be adopted in which an editing system maintains a record of the issued depth warnings and the adjustments made by the editor. The threshold is adjusted to maximize the number of times the warnings match the actions taken by the editor. The aim is to eliminate false positives in which a warning is triggered when no depth adjustment is made, and false negatives in which no warning is triggered but the editor makes an adjustment none-the-less. Given a set of depth transitions and the corresponding actions taken by the editor, a standard machine learning technique may be used to identify a function that takes as input the depth histograms from each side of a cut and outputs a "smart trigger" signal.

In certain embodiments, the system designer experiments with a set of threshold examples, and identifies values that give good results for most cases. The user is then given the option to adjust the threshold, thereby increasing or decreasing the trigger sensitivity.

The detection of perceived depth variations are of particular interest for portions of a stereo image sequence that straddle a cut between two clips. At such clip boundaries, discontinuous changes in perceived depth are likely to occur between the last images of the outgoing clip and the first images of the incoming clip.

The derivation of perceived depth, perceived depth metrics, and changes in perceived depth metrics have so far been discussed as applying to the entire frame of each image pair, i.e., computed for all the pixels of image pair. However, it is frequently valuable to limit the perceived depth computations to one or more subregions of the frame. Such subregions may correspond to a region of interest in an image, such as where a particular subject is located. For example, if clips on either side of a cut each include shots of a lead actor, it may be desirable to match the perceived depth of the actor across the clip boundary, even if that means allowing the perceived depth of other portions of the image to undergo a jump. Since one can expect the viewer to be concentrating on the lead actors, depth jumps in other subregions of the image sequence are less likely to be noticed. In various embodiments, the subregions of interest are identified by the user, for example by drawing on areas of the images before and after the transition. The areas of interest may also be identified automatically by the system, for example by tracking the position of specified regions from another frame, another set of frames or keyframes. Since the most important objects in a scene are frequently placed nearest to the viewer, another method of identifying the subregion of interest is to identify it with the major peak in the image pair depth distribution histogram having the smallest perceived depth (i.e., the largest negative disparity, or, lacking any negative disparity, the smallest positive disparity).

The perceived depth metrics for one or more subregions of various clips can be determined prior to cutting the clips together in a composition. The media composition system being used for the editing can then base the measurement of change in perceived depth metric based on these subregions, and issue a notification if the changes exceed a threshold value.

Figure 5:
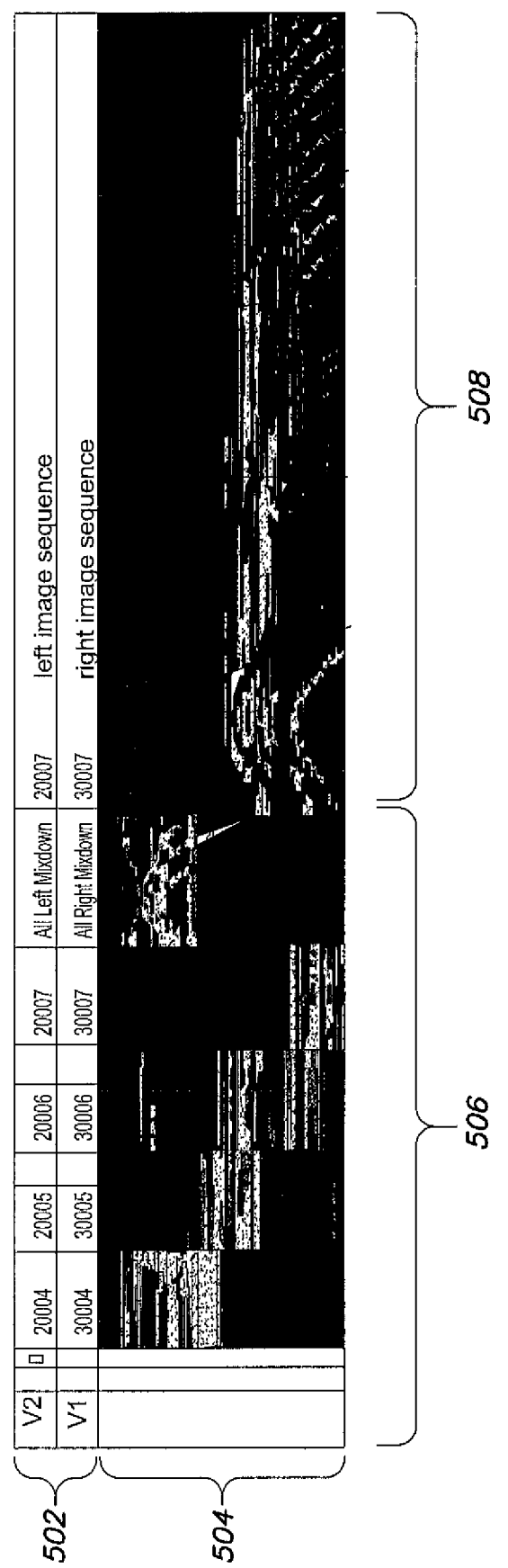
FIG. 5 shows a visualization of perceived depth for a series of clips using a ribbon of perceived depth distribution histograms along a timeline of a software application for editing stereoscopic 3D media.

Media composition systems generally strive to present all the aspects of a media composition in progress to the editor so as to facilitate creative decision-making. When working with stereoscopic 3D imagery, it is desirable to present the perceived depth of the sequence being edited, so that the editor can use this information to affect his editing choices, even in regions where it is not necessary to detect and correct for excessively rapid depth changes. The perceived depth distribution histograms described above provide a basis for visualizing the perceived depth distribution over time in stereoscopic 3D media. Each of the histograms is summarized along the timeline of the media composition system (FIG. 1, 128). In the described embodiment, each histogram is represented as a line perpendicular to the time axis of the timeline, with each position along the line corresponding to a value of the perceived depth, and each location on the line being displayed in a color or a grey scale shade representative of the value of the histogram for the perceived depth corresponding to that location. In the described embodiment the line is a column of pixels perpendicular to the timeline, each column representing a single frame of the stereo image sequence. In response to resealing of the time axis, the system may collapse multiple frames into a single histogram, thus representing an aggregate of several frames in a single column of pixels. The color (or shade of gray) of the resulting ribbon of summarized histograms provides a two dimensional visualization of the evolution of the depth distribution along the sequence; peaks in the histogram correspond to a particular color (or gray-level) in the ribbon, and temporal movement of the colored features perpendicular to the timeline show how objects move in depth over time. An example of such a histogram ribbon depth visualization is illustrated in FIG. 5. The left and right video tracks are displayed in the timeline view at the top (502) above the histogram ribbon (504). The left portion of the FIG. 506) shows the timeline and corresponding histogram ribbons for five short clips and reveals significant discontinuous jumps in the depth bracket and average depth across each of the clip transitions. In the right portion (508), the summarized histograms for a longer, single clip that was shot through the windshield of a moving car are displayed, showing the movement of several features, first away from the viewer, and then, at right, multiple features corresponding to trees and signposts successively approaching the viewer.

Figure 6:
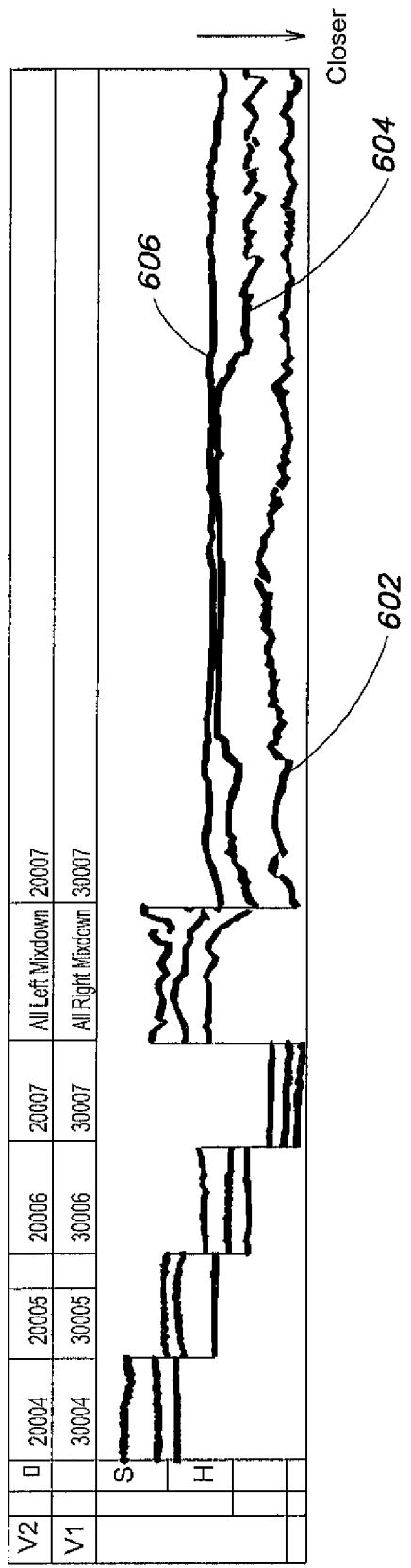
FIG. 6 shows a depth percentile curve timeline representation of perceived depths.

In another visualization method, a graph representing the values of the perceived depth metric over time is drawn on the timeline. Multiple curves may be plotted, each curve corresponding to a different metric. FIG. 6 shows the same portion of the timeline illustrated in FIG. 5, displaying curves representing the 20th percentile (602), 50th percentile (604), and the 80th percentile (606) of the perceived depth distribution. Another curve (not shown) may indicate the time-varying depth of a foremost peak, and/or of the highest peak (mode) in the distribution.

Stereoscopic 3D media opens up the third dimension to editors. When a new element is to be added to a stereo image, the editor may wish to place the element in a depth range that is not already populated, i.e., in an empty depth region, or adjust the depth range to create space for titles and graphical elements. For example, when adding graphics, such as titles, an editor may wish to place the titles in an empty region in the foreground, in front of other material in the stereo images. Using the perceived depth visualization methods described above, the editor may readily identify an empty region of depth space for a portion of the timeline, and select it, for example by drawing over dark regions of the histogram ribbon. The perceived depth values corresponding to the selected area are determined, and the corresponding disparity values calculated. Next, the editor may generate and apply graphics with the calculated disparity values in order to position them in the empty region of the depth volume.

When making decisions about perceived depth in a clip in a stereo video sequence, an editor may wish to view the perceived depth in the clip in the context of adjacent clips. This is facilitated by a multi-panel UI, which allows the editor to place a current clip in a center panel, with temporally adjacent clips appearing in additional panels to the left and right, while simultaneously allowing the details of particular frames to be viewed. The multiple panels appear from left to right in temporal order. In the described embodiment, a total of three panels are displayed, corresponding to a clip and its immediate predecessor and successor. The minimum number of panels is two; more than three facilitate viewing the clip in the context of more than two temporal neighbors. When more than three panels are displayed, the editor may select which one is to be treated as the current clip.

In a system featuring a multi-panel UI, the editor selects what is to be shown in the UI. The choices include an image view, a depth map view, as well as data panels that pertain to each of the clips. For the image view, illustrated in FIG. 7, the editor may choose whether to display the left image of a stereo pair, the right image, or a derived combination of them, such as a mix, or a difference. The figure shows an image view, with a frame from the current clip in the middle (702), a frame from the previous clip on the left (704), and a frame from the subsequent clip on the right (706). A mix image may be generated by a weighted average of the left and right images. In a mix image, objects located at the convergence plane are identified by having only a single edge outline, while objects in front of or behind the convergence plane appear to have double edges, offset by the disparity. A difference image is generated by subtracting the left camera image from the corresponding right camera image, or vice-versa, and adding an offset, e.g., 128 for an 8-bit image. The difference is zero where the two images are the same and non-zero where they differ, with the biggest differences appearing at object edges.

Figure 7:
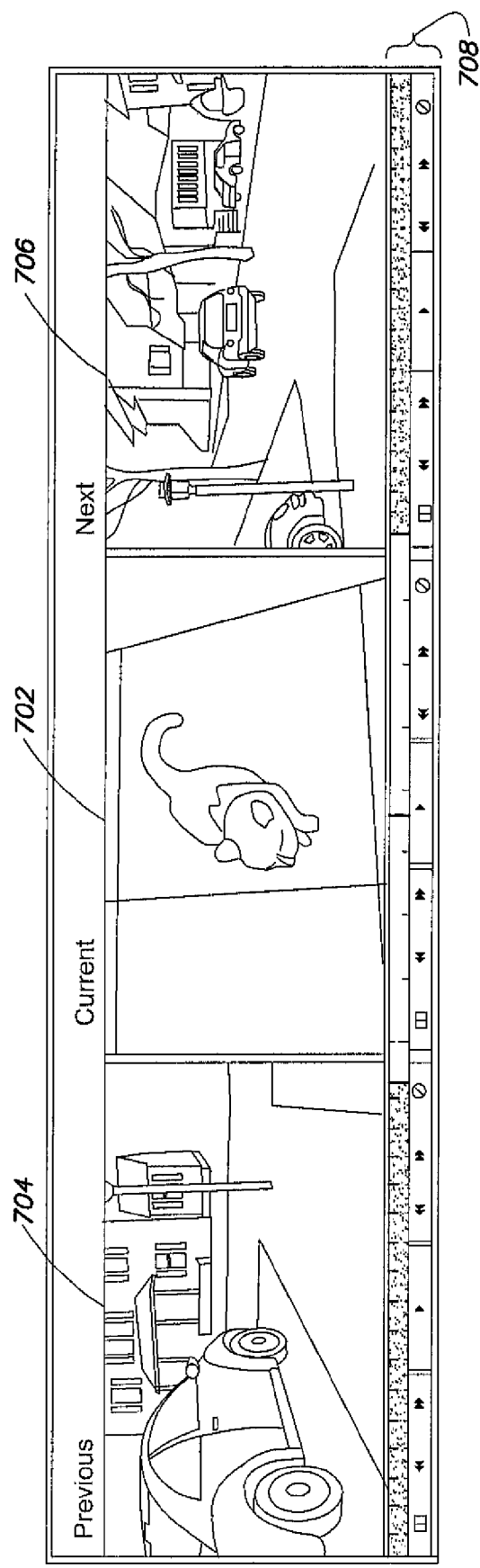
FIG. 7 shows the image view of a three-panel display.

As shown in FIG. 7, a particular frame time for each clip is selected via a small timeline (708) beneath each of the image views shown in the multi-panel UI. This time selection is automatically applied to all the views that represent that clip.

Figure 8:
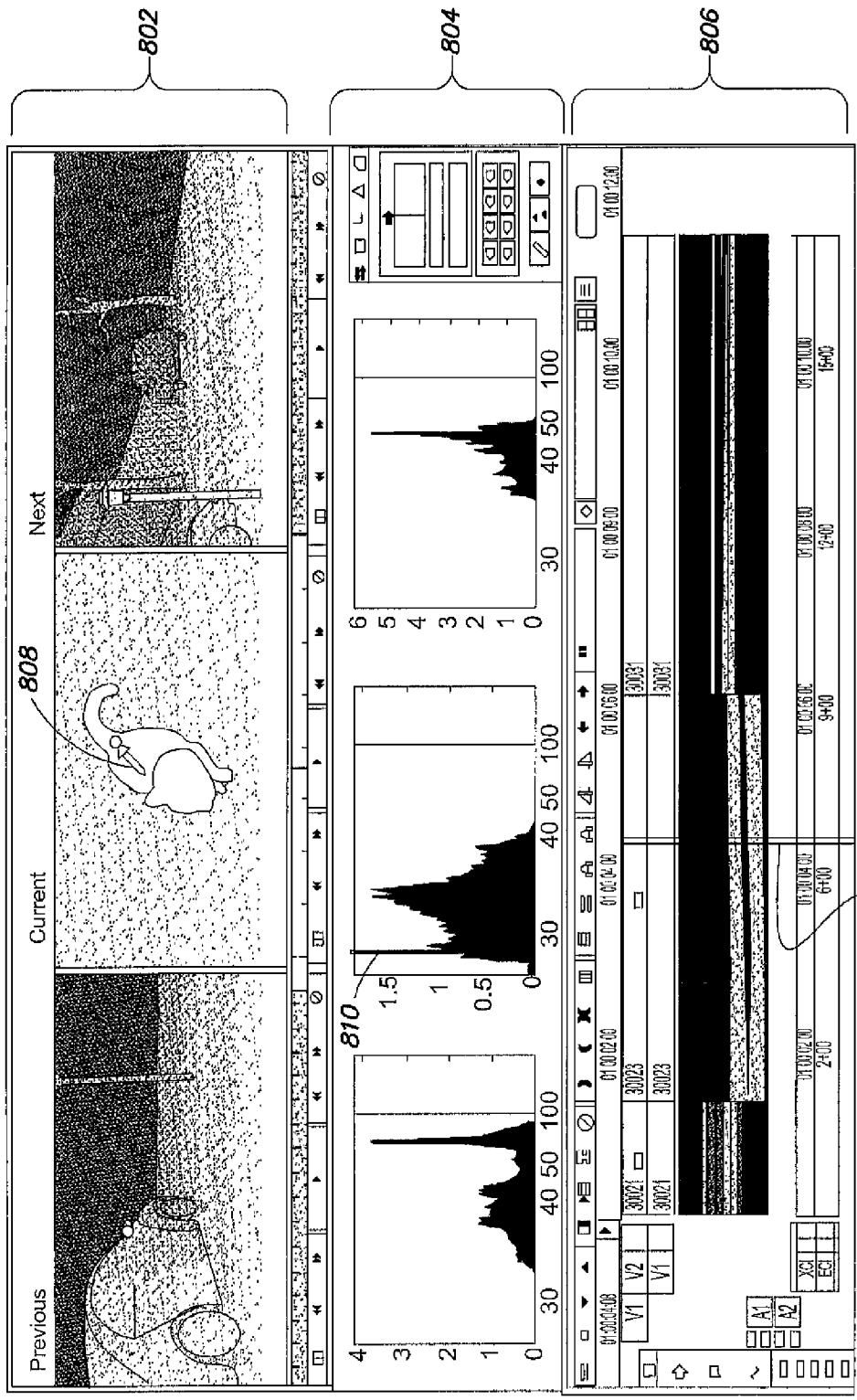
FIG. 8 shows the depth map view and depth histograms of a three-panel display, together with a timeline view.

A second representation of each of the displayed clips is a depth map view (802, FIG. 8). In the described embodiment, this is a gray-scale raster image, in which the shade of gray represents the relative depths within a clip at the particular frame time. From left to right, the depth maps shown in FIG. 8 correspond to the frames from the previous clip (704), current clip (702), and subsequent clip (706). When more than one depth map is available, the user may select one of the left-to-right map or the right-to-left map. The perceived depths are computed from the disparity data using system settings for output resolution and screen size. In order to better view details of certain depth ranges, the editor may adjust the depth scale and offset.

A histogram of the perceived depths (804) found within each of the selected frames is displayed below the corresponding image viewers. Below the multi-panel displays, timeline 806 of the overall sequence is displayed, which provides a temporally continuous context of the subsequence within the overall sequence. The time range displayed by the timeline is under the editor's control, and by default corresponds to the combined time span corresponding to the clips displayed in the multi-panel display.

Figure 9:
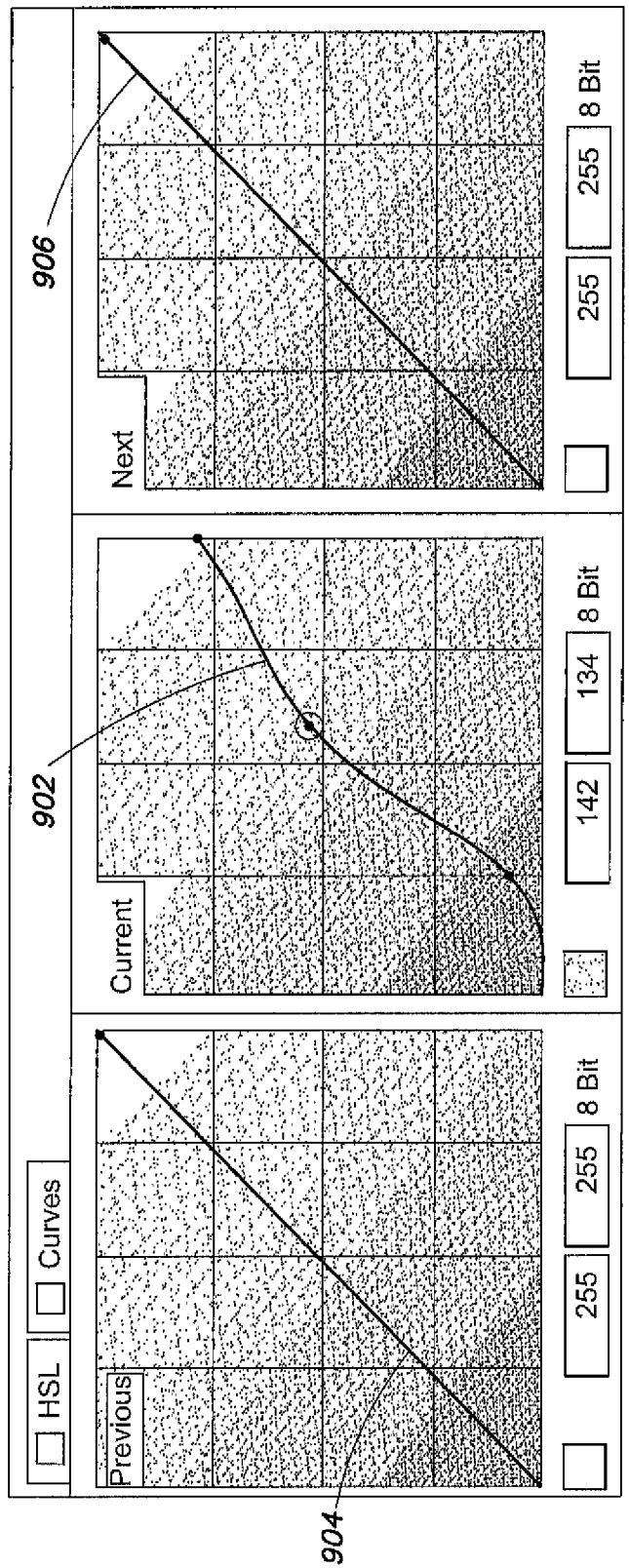
FIG. 9 shows a three-panel depth curve display.

In addition, a depth curve editor may also be displayed (FIG. 9). The depth curve represents the mapping from input depth to output depth values for an image. The curve editor may be used to specify both linear and non-linear depth shifts, as described below. In the described embodiment, a depth curve corresponding to the displayed image from each of the current (902), previous (904), and succeeding clips (906) is shown. Typically, the depth curves for the previous and next clips are straight lines with gradient 1, indicating that no depth adjustment is being performed, i.e., the output depths equal the input depths. The curve for the current clip, on the other hand, shows the application of a non-linear depth shift. We discuss depth curve editing in more detail below in connection with FIGS. 10A, 10B, and 10C.

The system provides tools for reducing or eliminating perceived depth problems associated with discontinuities or portions of a sequence having unacceptably rapid change in the perceived depth metric. Such portions are more likely to occur at clip transitions, but are not limited to such regions. The techniques described below in connection with depth shifting at clip transitions may also be used for depth grading to resolve depth issues located entirely within a single clip.

We now describe techniques for altering the depth values of portions of a stereoscopic video sequence, a process also referred to as depth grading. In the described embodiment, the depth grading serves to achieve a match between a source depth and a destination depth. When depth grading is performed across a clip boundary, the source depth corresponds to a region in a frame within the outgoing clip, and the destination depth corresponds to a region within a frame in the incoming clip.

The first step in depth correction methods is to select the source depth and the destination depth. An eye dropper tool may be used to select these depths directly from a frame in the image view, from the depth map view, or from the corresponding depth histogram. For the source depth, the eye dropper is used on the current image (within the current clip) or its corresponding depth map or histogram views. The destination value may be similarly selected by the eye dropper from a region either in the previous image panel or within the next image panel. Alternatively, a lasso or paint tool may be used to select a region in a current image from which source depth value is determined, and a region in a next or previous image for the destination depth. The corresponding depth values are obtained by averaging the depth of the lassoed or painted pixels. Still other ways of selecting the source and destination values include directly pointing to and selecting a depth value in the depth histogram, or manually entering the depth into the UI. In FIG. 8, eye dropper tool 808 is shown in the current image depth map, and the system automatically indicates the depth corresponding to that selection in the image's depth histogram (810). The figure shows an editor using the eye dropper tool to select the source depth corresponding to the cat, which appears as the bright area in the depth map. Histogram line 810 indicates the value of the selected depth, and scrubber bar 812 indicates the temporal location of the frame within the current clip. In the next step, the editor selects the destination depth in the depth map of the frame from the subsequent clip, optionally using the eye dropper tool again, or by typing a depth value into a destination depth box provided by the UI.

After selecting the source and target depth, the editor requests that the match be performed, using, for example, a "match" button provided in the UI. A matching operation is then performed to match the source value to the destination value in the current clip. The current clip depth map, depth histogram, and pseudo-color histogram ribbon on the timeline are updated to reflect the result of the matching operation.

For selecting various depth matching methods, including linear and non-linear depth shifting, a curve editor tool is provided. A depth curve displays the mapping between input depth values (i.e., before depth shifting), and the output depth values corresponding to the required depth adjustment. The curve editor tools enable the user to specify depth shifts by dragging either the entire curve or selected points on the curve.

Figure 10A:
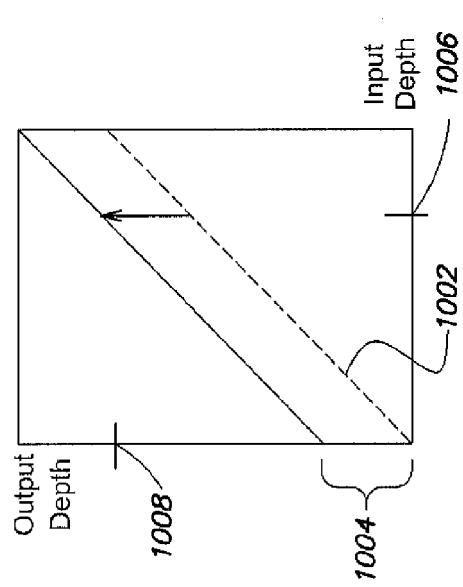
FIGS. 10A, 10B, and 10C show depth curve editing.
Figure 10B:
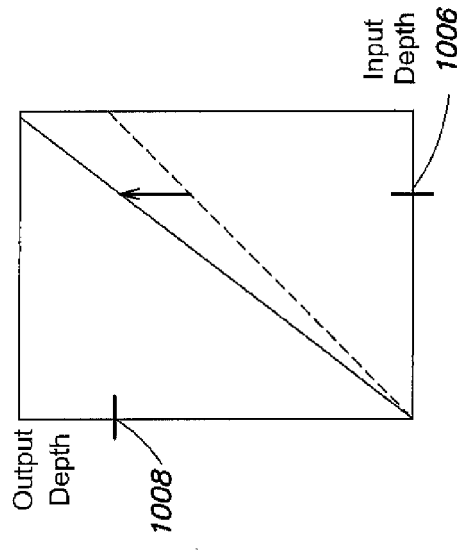

The simplest matching method is to apply a uniform linear depth shift, which corresponds to adding or subtracting a constant to all of the depths in the image. FIG. 10A shows depth curve shift corresponding to such a match. Default depth curve 1002 (which corresponds to no depth shift, i.e., a straight line through the origin of gradient 1) is shifted vertically by an amount corresponding to the depth shift (1004) to achieve a transformation from source depth 1006 to destination depth 1008. In terms of the depth histogram, this corresponds to sliding the entire histogram left or right by an amount corresponding to the depth shift. In image terms, it corresponds to shifting the left and right images relative to each other by an amount determined by the difference between the source depth and the destination depth.

Figure 11:
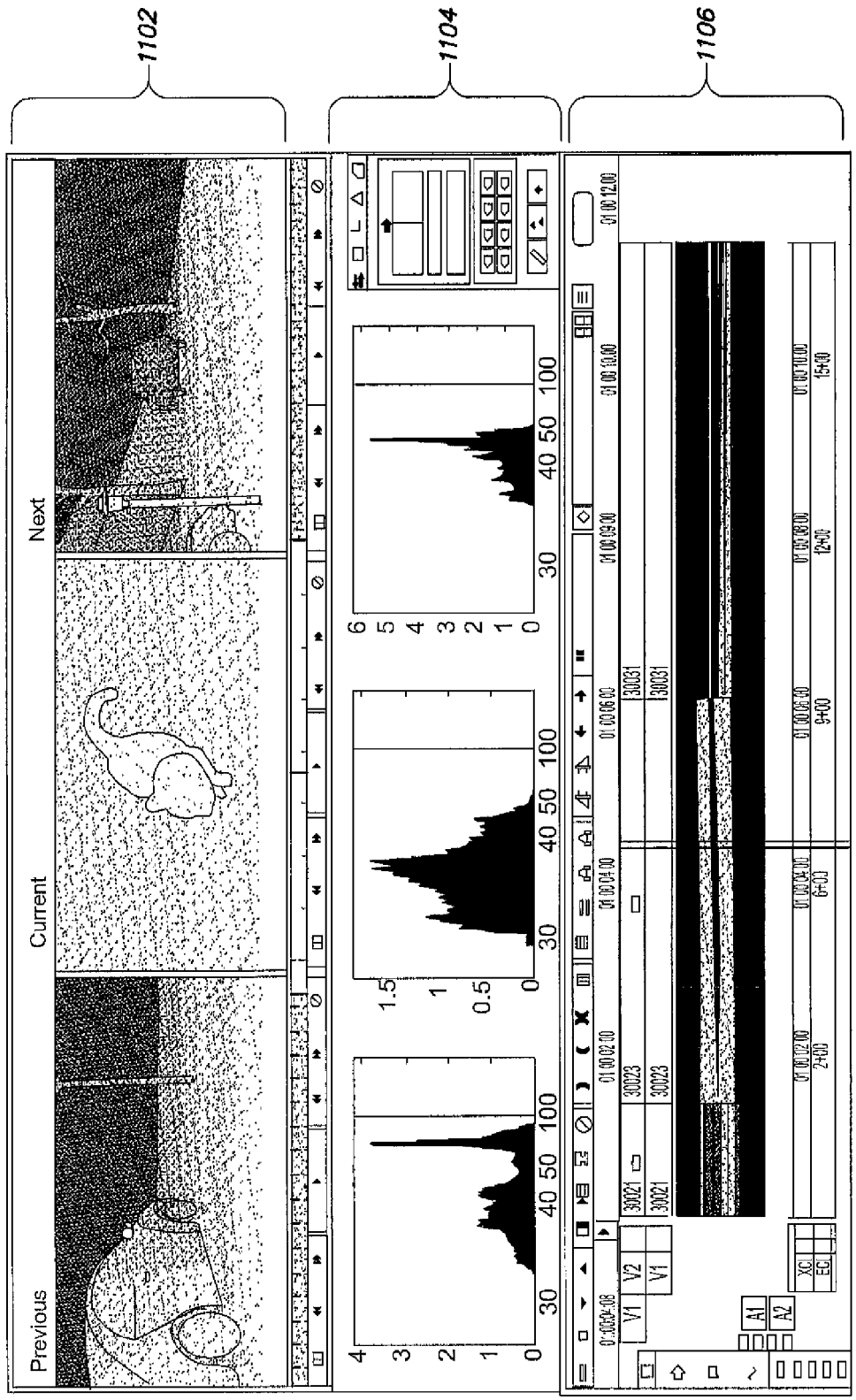
FIG. 11 shows depth maps, depth histograms, and the timeline for the clip sequence corresponding to FIGS. 7 and 8 after depth shifting of the current clip.

FIG. 11 illustrates the effect of performing a match operation by applying a uniform depth shift to current image 702 (FIG. 7) with the source depth corresponding to the cat and the destination depth corresponding to the lamp post showing in image 706 from the subsequent clip. Depth map view 1102 shows that the gray-scale value of the cat is now the same as that of the lamp post, and the corresponding histogram (center histogram in histogram view panel 1104) shows a uniform shift to smaller disparities, which correspond to increased perceived depth. In addition the depth histogram in timeline 1106 shows a vertical shifting of the current clip depth histogram ribbon shown in region 1108 of the timeline, so that the depth range and salient features are now in approximate alignment across the clip boundary. The histogram ribbon view provides a high level view of the quality of the matching, and the degree to which abrupt perceived depth changes have been eliminated.

Another depth disparity correction approach is to apply a non-uniform linear shift, in which the slope of the depth curve is adjusted to bring the depth of a selected subregion of the current image into correspondence with the target depth by stretching or shrinking the depth field. In terms of the depth curve, this shift corresponds to altering the gradient of the curve, and optionally shifting the curve as well. This kind of correction would be useful when trying to match two clips, one with a greater depth range than the other. The depth range of the clip with the shallower depth is stretched to make it better match the clip with greater depth. In terms of depth histogram, the shallower depth field has the narrower histogram; the linear shift scales up the width to match that of the clip having the greater depth range.

Figure 10C:
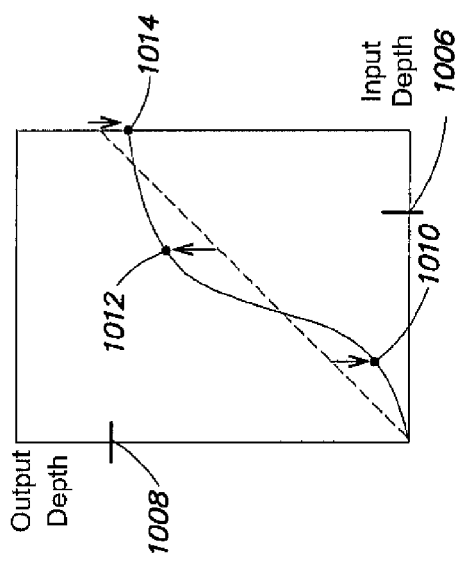

Multiple selections and match constraints within a given source image and target image result in a non-linear transformation of depth values. Each specified match generates a point on the depth curve. The depth curve editor is a convenient tool for accomplishing this. The user pulls the curve in order to set a mapping of a particular input depth value to a particular output depth value at the depth matching locations, as illustrated in FIG. 10C (1010, 1012, 1014). The remainder of the depth curve is automatically adjusted to retain smoothness, such as for example by fitting Bezier curves. The resulting curve is used to generate a look-up table which may be applied to the depth values of an image pair. Non-linear depth shifts may alternatively be defined by performing multiple matches within a single source and destination image pair, i.e., specifying more than one source depth and corresponding destination depth. To implement such transformations, the source frames are warped and re-rendered. The effect of such a transformation is to warp the perceived depth field, with regions corresponding to the different depth ranges being stretched or shrunk by different amounts in order to achieve the desired disparity. Certain limits to the amount of warping apply, so that the result looks believable, and artifacts are not created.

In various embodiments, the depth grading process is partially or fully automated. The source and destination depth values discussed above may be derived automatically from analysis of the depth histogram, using, for example, the same metric that is used to identify jumps in the depth bracket. As an example, the mean depth value is used. The subsequent depth grading may also be automated. After computing the mean depth and one or more additional parameters of the depth distribution, such as the depth bracket (e.g., the range of depths between the 20th and 80th depth percentiles) on each side of a cut between two clips, the system automatically computes the curve that maps one to the other. If the computed depth shift is linear, all parts of the image change by the same amount, and in a depth map view (e.g., FIG. 8, 802), all parts of the depth map image change by the same number of gray levels. The system is able to determine all the grading parameters, including the most effective grading type (uniform linear, non-uniform linear, and non-linear), as well as the extent of the grading required. The grading type may be restricted by a system setting or a user preference. In some systems, not all grading types are available.

The editor may choose the transition region over which to apply the depth disparity corrections. In various embodiments, the transition region is entirely within the tail end of the outgoing clip, entirely within the beginning portion of the incoming clip, and within both clips. In one approach, the editor selects reference frames in each of the clips, and the transition regions correspond to the portion of the clips between the reference frames and the clip boundary.

The depth correction may be applied in a temporally linear fashion, in which the depth curve is adjusted in equal increments to each successive frame within the transition region. This can be implemented using a blend parameter that determines how to generate the depth curve for each frame by interpolating between the source and the target depth curves. The depth values for each frame are then altered according to a look-up table generated from the depth curve generated for that frame. Each of the frames in the transition region is then re-rendered. This approach applies both to transition regions that lie within just one of the two adjacent clips, as well as to transition regions that lie within both clips.

A sudden onset of a depth adjustment at the beginning of a transition region may look unnatural. To overcome this effect, the depth increments may be applied non-uniformly in time across the transition region. The depth shifting is started slowly, increased to a maximum at the mid-point of the transition region, and then reduced gradually to zero at the end of the transition region. Such non-linear shifting over time applies to transition regions falling within just one of the clips, or across a transition region spanning the outgoing and the incoming clips.

The various techniques and tools for perceived depth detection, visualization, and correction described above may be implemented within a camera and/or in an attached real-time processor. In one embodiment, a camera includes a display that shows the image seen through a touch screen viewfinder. The camera user selects the convergence point by tapping on an object at the desired convergence point. Optionally, the user also selects other objects, defined either by selecting a region, e.g., by drawing around it, or by selecting a point by tapping on it, and adjusts their depth relative to the converged region. The adjustment may be performed using a slider that pops up below the images on the viewfinder. The camera and/or real-time processor adjusts the convergence setting of the camera, computes the disparities, and maps them to the chosen ranges. In some embodiments, the user adjusts the depth mapping by using a curve editor to alter the depth curve by dragging points on the curve on the touch screen.

The various components of the system described herein may be implemented as a computer program using a general-purpose computer system or specialized device. Such a computer system may be a desktop computer, a laptop, a tablet, a portable device such as a phone (e.g., a stereo camera phone), other personal communication device, or an embedded system such as a camera with associated processor units.

Desktop systems typically include a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic or optical discs, which may include an array of local or network attached discs.

A system such as described herein may be implemented in software or hardware or firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method comprising:
   a media composition software application receiving a sequence of stereo image pairs, each stereo image pair including a left eye image and a right eye image, wherein a user interface of the media software application includes a displayed multi-track timeline corresponding to the sequence of stereo image pairs;
   for each stereo image pair of the sequence:
      determining a disparity value between a plurality of locations within the left eye image and a corresponding plurality of locations in the right eye image of the stereo image pair;
      computing a value of a perceived depth metric from the disparity values, wherein the perceived depth metric is based on at least one of:
         an average of the perceived depth values of the plurality of locations; and
         a perceived depth value of a feature in a distribution of the perceived depths of the plurality of locations, wherein the feature characterizes one or more scene elements in the sequence; and
      issuing a notification when a measure of change of the perceived depth metric values among the stereo image pairs of the sequence exceeds a predetermined threshold, wherein the notification is displayed as a graphical indicator on the multi-track timeline at a location indicative of a location in the sequence at which the measure of change of the perceived depth metric exceeds the threshold.

2. The method of claim 1, wherein the disparity values are determined by a plug-in software module in data communication with the media composition software application.

3. The method of claim 1, further comprising:
   for each stereo image pair of the sequence:
      using the disparity values to compute corresponding perceived depth values; and
      wherein computing the value of the perceived depth metric is based on the perceived depth values.

4. The method of claim 1, wherein the feature is a peak in the distribution of perceived depths of the plurality of locations.

5. The method of claim 1, further comprising:
   for a selected stereo image pair of the sequence, using the media composition software application to output a histogram of the perceived depth distribution on a display; and
   enabling a user of the software application to define the feature on the display.

6. The method of claim 1, wherein the plurality of locations corresponds to a plurality of pixel locations in one of the left eye image and the right eye image.

7. The method of claim 1, wherein the disparities are determined by building a reconstruction of three dimensional scene points by using sequences of scene images captured simultaneously by a set of three or more cameras, each camera capturing the scene from a different viewpoint, and wherein each of the left eye images of the sequence of stereo image pairs were captured by a first one of the set of cameras and wherein each of the right eye images of the sequence of stereo image pairs were captured by a second one of the set of cameras.

8. The method of claim 1, wherein the measure of change is a rate of change of the perceived depth metric among two or more sequentially adjacent stereo image pairs of the sequence.

9. The method of claim 1, wherein the sequence includes a plurality of clips, and wherein the measure of change is based on a difference between the perceived depth metrics of one or more stereo image pairs of a first clip of the plurality of clips and one or more stereo image pairs of a second clip of the plurality of clips.

10. The method of claim 1, wherein a user of the software application selects a first and a second stereo image pair from the sequence, and wherein the measure of change is based on a difference between the perceived depth metrics of the first and second stereo image pairs.

11. A method comprising:
   a media composition software application receiving a sequence of stereo image pairs, each stereo image pair including a left eye image and a right eye image, wherein a user interface of the media software application includes a displayed multi-track timeline corresponding to the sequence of stereo image pairs;
   for each stereo image pair of the sequence:
      receiving depth information for each of a plurality of locations within the stereo image pair;
      based on the depth information, an output resolution, and a screen size, deriving perceived depth information for each of the plurality of locations within the stereo image pair; and
      computing a value of a perceived depth metric for the stereo image pair based on the derived perceived depth information; and
   issuing a notification when a measure of change of the perceived depth metric values among the stereo image pairs of the sequence exceeds a predetermined threshold, wherein the notification is displayed as a graphical indicator on the multi-track timeline at location indicative of a location in the sequence at which the measure of change of the perceived depth metric exceeds the threshold.

12. The method of claim 11, wherein the perceived depth information includes disparity values.

13. A method for visualizing perceived depth values within a sequence of stereo image pairs, the method comprising:
   a media composition software application receiving the sequence of stereo image pairs, wherein each stereo image pair comprises a left camera image and a right camera image, wherein a user interface of the media software application includes a displayed multi-track timeline corresponding to the sequence of stereo image pairs; and
   for each stereo image pair of the sequence:
      determining a disparity value between a plurality of locations within the left eye image and a corresponding plurality of locations in the right eye image of that stereo image pair;
      based on the disparity values, an output resolution, and a screen size, deriving perceived depth values for each of the plurality of locations within the stereo image pair;
      displaying a representation of a distribution of the perceived depth values of the plurality of locations within the stereo image pair, wherein the representation is displayed on the multi-track timeline of the media composition software application at a timeline location corresponding to a sequence position of the stereo image pair within the sequence of stereo image pairs; and
      issuing a notification when a measure of change of the perceived depth metric values among the stereo image pairs of the sequence exceeds a predetermined threshold, wherein the notification is displayed as a graphical indicator on the timeline at a location indicative of a location in the sequence at which the measure of change of the perceived depth metric exceeds the threshold.

14. The method of claim 13, wherein the representation comprises a column of pixels perpendicular to a temporal axis of the timeline, a position along the column of pixels representing a corresponding perceived depth value, a pixel in the column at the position having a visual attribute indicating a magnitude of a population of pixels in the stereo image pair having the perceived depth value represented by the position along the column.

15. The method of claim 14, wherein a plurality of the columns are displayed adjacent to each other to form a histogram ribbon in temporal correspondence with the timeline.

16. The method of claim 15 further comprising:
   enabling a user of the software application to select a contiguous region of the histogram ribbon;
   determining a range of perceived depth values defined by a range of the selected region perpendicular to the timeline; and
   enabling the user to insert graphical elements into a temporal subset of the sequence of stereo image pairs defined by a horizontal extent of the contiguous region of the histogram ribbon, wherein the graphical elements are placed within the determined range of perceived depth values.

17. The method of claim 16, wherein the determined range of perceived depths corresponds to a substantially unoccupied portion of the perceived depth range of stereo image pairs within the defined temporal subset of the sequence.

18. The method of claim 16, wherein the determined range of perceived depth values corresponds to depth values nearer to a viewer of the sequence of stereo image pairs than an average of the perceived depth distribution of the defined temporal subset of the sequence.

* * * * *